United States Patent [19]
Wurth

[11] 3,850,481
[45] Nov. 26, 1974

[54] BRAKE CONTROL DEVICE FOR VEHICLES

[75] Inventor: Hans-Jorg Wurth, Lohhof, Germany

[73] Assignee: Knorr-Bremse GmbH, Munich, Germany

[22] Filed: Jan. 9, 1974

[21] Appl. No.: 431,981

[30] Foreign Application Priority Data
Jan. 9, 1973  Germany............................ 2300905

[52] U.S. Cl....................... 303/25, 303/15, 303/20, 303/50
[51] Int. Cl............................................. B60t 13/62
[58] Field of Search............................ 303/1–3, 15, 303/16, 20, 25, 28, 35, 50, 52, 53, 90

[56] References Cited
UNITED STATES PATENTS

| | | | |
|---|---|---|---|
| 3,158,409 | 11/1964 | Hughson et al................... | 303/25 X |
| 3,572,849 | 3/1971 | Engle.................................... | 303/25 |

Primary Examiner—Duane A. Reger
Attorney, Agent, or Firm—Edmund M. Jaskiewicz

[57] ABSTRACT

A brake control device for railway vehicles has a remote indicator for indicating the state of connection of a plurality of control lines for controlling a plurality of valves connected to a source of control energy in order to introduce a predetermined level of brake pressure into a brake cylinder in response to particular connections of the control lines. A plurality of control paths corresponding to the plurality of control lines are provided and the paths are equal in length or subtend equal angles. The sequence of these paths is designated by position $m$ beginning at 0, 1, 2 . . . . Each path comprises an alternating series of $2^m/2$ sensing and non-sensing zones which are sensed by a plurality of sensing elements. One of the sensing elements is located opposite the path of the highest position and two additional sensing elements which are spaced longitudinally along a path are located opposite each of any additional paths. One of the pair of sensing elements is positioned before and the other after the sensing element of the highest position path or with respect to the corresponding elements of the next highest path. Monitor means are connected to the sensing elements for selecting in each state of connection of the control lines only one of the two sensing elements of the second highest position path over a sensing or non-sensing zone and for selecting one of the two sensing elements of the next lower position path with respect to the sensing element of the highest position path.

14 Claims, 7 Drawing Figures

BRAKE CONTROL DEVICE FOR VEHICLES

The present invention relates to a brake control device for railway and other vehicles, more particularly, to such a control device which has a remotely positioned indicator for indicating the state of connection of control lines to control valves connected to a control source of energy in order to introduce a certain predetermined level of brake pressure into a brake cylinder in response to a specific state of connection and in which every state of connection will effect only a certain braking level and a monitor device assures that for consecutive braking stages only the state of connection of the control lines associated with a single braking stage is effective at each indicated stage of braking.

Brake control devices of this general type of brake control devices which are similar in principle are known, such as from the German patent 1 261 401 and German Publication Document 1 455 307.

The German patent 1 261 401 discloses an electropneumatic brake control device that has three electric control lines $a$, $b$ and $c$, in connection with a switching drum used as remote-position indicator. The drum has contacts so arranged that in eight consecutive positions "0" to "7" of the switching drum the control lines $a$, $b$ and $c$ are connected to an electric supply line in the switching combinations shown in Table 1 wherein connection "0" indicates an absence of electric current in the control lines and "L" indicates the presence of electric current in the control lines.

TABLE 1

| Position | a | b | c |
|---|---|---|---|
| 0 | O | O | O |
| 1 | L | O | O |
| 2 | L | L | O |
| 3 | O | L | O |
| 4 | O | L | L |
| 5 | L | L | L |
| 6 | L | O | L |
| 7 | O | O | L |

The control lines $a$, $b$ and $c$ lead in each connection to excitation windings of electromagnetically-actuated switches whose contacts are in an electric circuit which controls the three electromagnetic valves A, B and C. The switching contacts of the switches are arranged so that in the consecutive position "0" to "7" of the switching drum the solenoid valves assume the valve positions shown in Table 2, in the proper sequence of positions of the switching drum, in which connection "O" indicates in the table that a particular connected pressure-medium line is shut off and "L" indicates that the pressure-medium line is opened.

TABLE 2

| Position | A | B | C |
|---|---|---|---|
| 0 | O | O | O |
| 1 | L | O | O |
| 2 | O | L | O |
| 3 | L | L | O |
| 4 | O | O | L |
| 5 | L | O | L |
| 6 | O | L | L |
| 7 | L | L | L |

From Table 2 it is apparent that multiple changes in the valve positions occur between the positions "1" and "2", "3" and "4" and "5" and "6". However, the remote-position indicator in connection with the three lines $a$, $b$ and $c$ in each case effects only a single change from a position to a subsequent position, as may be seen from Table 1. In this manner it is assured that, even during a slow transition of the remote-position indicator from a position to a next-adjacent position during a halt in an intermediate position, the brake cylinder will not be subjected to the action of pressure medium which is inaccurate by several stages.

The German Publication Document 1 455 307 describes a brake control device of the above-mentioned type, wherein seven switches are arranged one after another in a circuit and are actuated successively by a handle. Three electromagnetic valves are energized through the switches and in such a manner that during the successive actuation of the switches the valves are energized in successive stages as in the switching sequence given in Table 2 ("O" indicates the nonenergized and "L" indicates the energized state). The switches are snap switches, in order to prevent simultaneous actuation of two switches and any possibility of switching combinations based on stages that are outside a particular sequence, when passing from a stage to the next stage through the actuation of successive switches even for a brief instant or in the case where the handle is stopped in an intermediate position. Thus, only a single switch is actuated in each case in any position of the handle which actuates the switches and, accordingly, only the switching stage associated with the actuated switch is effective for a particular switching combination of the valves.

While in the first-mentioned known device the three electromagnetically actuated switches must be preceded by a special remote-position indicator (a switching drum) in order to prevent erroneous settings, and the indicator produces only a single change in a particular position for any succeeding position, the seven switches arranged in series in the second-mentioned known device must be snap switches. In the first case, the costs and space required are relatively high. In the second case mechanical snap actions of the switches are required which subjects the switches to wear and thus the switches require a frequent careful checking.

It is therefore the principal object of the present invention to provide a novel and improved brake control device of the type generally described herein.

It is another object of the present invention to provide such a brake control device that produces only a single change between two switching stages but which avoids a combination of switches with a special remote control indicator and which does not require snap-action switches.

In the present invention there is disclosed a brake control device for railway vehicles and the like which has a remote indicator for indicating the state of connection of a plurality of control lines for controlling a plurality of valves connected to a source of control energy in order to introduce a predetermined level of brake pressure into a brake cylinder in response to particular connections of the control lines. According to one aspect of the present invention, there are provided a plurality of control paths corresponding to the plurality of control lines. The paths are equal in length or subtend equal angles and the sequence of these paths is designated by position $m$ beginning at 0, 1, 2 . . . .

Each path comprises an alternating series of $2^m/2$ sensing and non-sensing zones which are sensed by a plurality of sensing elements. One of the sensing elements is located opposite the path of the highest position and two additional sensing elements are located opposite each of any additional paths and are spaced longitudinally thereon. One of the pair of sensing elements is positioned before and the other after the sensing element of the highest position path or with respect to the corresponding positions elements of the next highest path. Monitor means are connected to the sensing elements for selecting in each state of connection of the control lines only one of the two sensing elements of the second highest position path with respect to the position of the location of the sensing elements of the highest position path over a sensing or non-sensing zone and for selecting one of two sensing elements of the next lower position path by a selected sensing element of a path with respect to the sensing element of the highest position path.

This arrangement assures that even during a slow movement of the indicator from one position to another position or during a stopping of the indicator in an intermediate position the brake cylinder will not be acted upon by a level of a pressure medium which does not correspond by several stages to the indicated stages on the indicator.

In order to insure that whenever the indicator is halted in or near an intermediate position a preceding or succeeding stage is not randomly switched, there is further provided an additional auxiliary sensing element position opposite the highest position path at such a distance from the main sensing element and the sensing and non-sensing zones are so related in length that only one sensing element can ever be positioned over a sensing zone. In addition, the monitor means connected to the sensing device contains a signal storage means which stores the signal of one of the sensing elements until this signal is erased through the signal of the other sensing element.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be discribed in detail.

Figure 1:
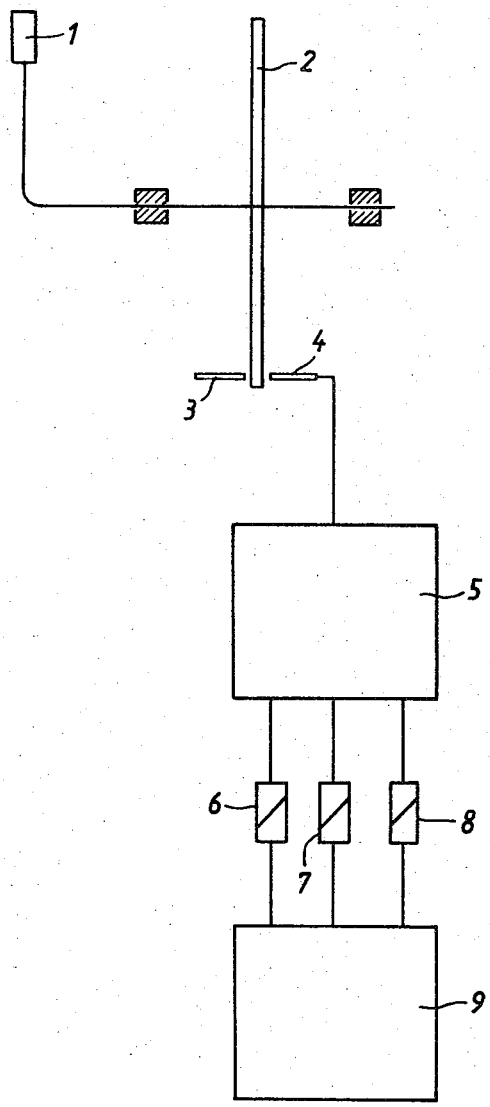
FIG. 1 shows schematically the structure of the brake control device of the present invention.

FIG. 1 shows a pivoted brake control lever 1 on which a disk 2 is mounted. The disk contains slots arranged in a particular manner with respect to one another on three annular sectors. Nozzles 3 and 4 facing one another are located on either side of the disk. Nozzle 3 on a side of disk 2 transmit fluid jets to nozzle 4 on the other side of the disk. The jets of fluid are intercepted by nozzle 4 only when the jets of fluid are able to pass directly through the slots in the disk. The jets of fluid intercepted by nozzle 4 are transmitted as signals to a fluid monitor circuit 5. Depending on the position of brake control lever 1, three solenoid valves 6, 7, and 8 are energized in the circuit 5 in a certain switching combination for the purpose of controlling a brake control valve 9 that monitors the level of brake pressure in the brake cylinders.

Figure 2:
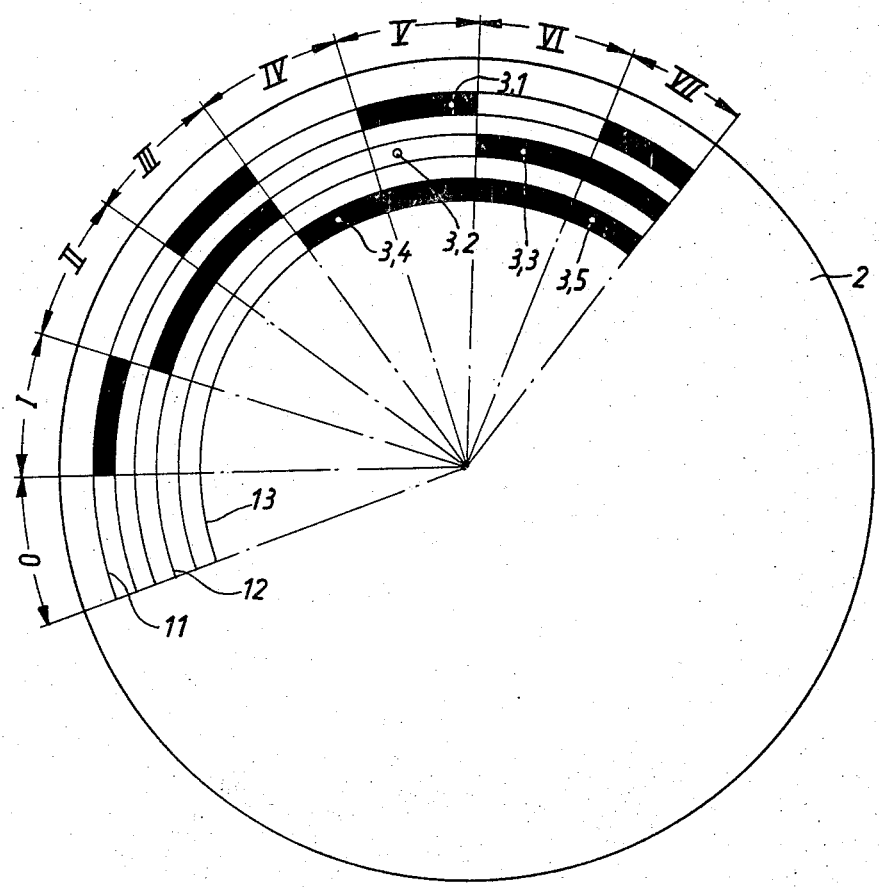
FIG. 2 shows a part of the brake control device of FIG. 1 upon which are the sensing paths in enlarged scale.

The slots arranged on concentric circles of the disk are shown in FIG. 2. Nozzles 3 and 4 actually consist in each case of five nozzles that are stationary in relation to disk 2. Among these nozzles, only nozzles 3.1 to 3.5 are shown in FIG. 2 as points on a side of the disk. In this particular embodiment, a nozzle 3.1 is situated on an outer sensing path or track 11. Two nozzles 3.2 and 3.3 are located on a following central track 12 and two additional nozzles 3.4 and 3.5 are located on an inner track 13.

Disk 2 can be turned by means of lever 1 in FIG. 1 from a zero position to a position VII. During the passage from one position to the next succeeding position, the same arc of the circle is traversed in each case. Accordingly, the effective turning range of disk 2 is divided into 8 sector angles of equal size, which divides tracks 11, 12 and 13 into sections or segments that are equal. In the area of the segment for the zero position, none of tracks 11, 12 and 13 possesses a slot. The outermost track is slotted in the area of the segments for positions I, III, V, and VII, i.e., in a sequence of alternating steps, and it is not slotted in the area of the segments for the positions II, IV, VI, i.e., likewise in a sequence of alternating steps. Central track 12 is not slotted in the area of the segments for positions II and III as wel as VI and VII. In contrast with outer track 11, the unslotted and slotted sections of central track 12 are present in each case in a sequence of alternating double steps. Inner track 13 is not slotted in the area of the segments for positions zero to III and slotted in the area of the segments for positions IV to VII. While in outer track 11 $2^2$ alternating slotted and unslotted sections are provided in each case, the inner track still contains $2^0$ unslotted and slotted sections, i.e., a slotted and an unslotted section. The slotted and unslotted sections can be described as sensing and non-sensing zones.

If more than three tracks would be required, the tracks following outer track 11 in the sequence would contain correspondingly $2^3$, $2^4$, etc., alternating slotted and unslotted sections, in the areas of the segments determined by the selected number of stages.

It is clear that the number of stages can be selected in accordance with the requirements of the brake control device. The stage number 8, selected in this example for the seven consecutive brake stages inclusive of zero stage, is frequently required in brake control devices of railroad vehicles.

Nozzles 3.1 and 3.5 are arranged in a particular manner in relation to the three tracks and this arrangement is normally unchanged. In this embodiment, the nozzles are fixed and disk 2 is turned by means of lever 1 (FIG. 1). It is apparent that disk 2 can also be fixed and the nozzles combined into a unit which is turned about the axis of disk 2 by means of a suitable lever. Only a portion of the disk is employed for control purposes. This portion is determined by the ordinary range of pivoting of the lever for brake control devices of railroad vehicles. It is apparent that the range of pivoting and, thus, the effective portion of the disk can be selected in accordance with specific requirements and conditions. As explained in more detail below, the entire disk can also be available for control purposes with a maximum range of pivoting of 120°.

Nozzle 3.1 is arranged opposite the outermost track 11. Two nozzles 3.2 and 3.3 are arranged opposite the central track 12. Nozzle 3.2 is set back by a half segment angle of a segment with respect to nozzle 3.1 and nozzle 3.3 is placed in front of nozzle 3.1 by a half segment angle. In a corresponding manner, nozzle 3.4 of the inner track is set back by a half segment angle with respect to nozzle 3.2 and nozzle 3.5 is placed in front of nozzle 3.3 by a half segment angle.

Nozzles 3.1 to 3.5 are connected to a circuit which is not shown in FIG. 2 but which will be described in detail below. According to the circuit, forward-set (right) nozzle 3.3 is always effective with respect to nozzle 3.2 when nozzle 3.1 is positioned over an unslotted section of track 11 and rear (left) nozzle 3.2 is always effective with respect to nozzle 3.3 when nozzle 3.1 is positioned over a slotted section of outer track 11. Further, forward (right) nozzle 3.5 is effective with respect to nozzle 3.4 when the nozzle effective in track 12, e.g., nozzle 3.3 is positioned over an unslotted section of central track 12 and rear (left) nozzle 3.4 is always effective with respect to nozzle 3.5 when the nozzle effective in track 12, e.g., nozzle 3.2 is positioned over a slotted section of track 12.

In the illustrated position of the nozzles in relation to disk 2, nozzles 3.1, 3.2 and 3.5 are effective. Nozzle 3.1 is situated in this example in the area of position V over a slotted or sensing section of track 11. Nozzle 3.2 is situated in track 12 over an unslotted section and nozzle 3.5 is situated in track 13 over a slotted section. If nozzle 3.1 in FIG. 1 controls solenoid valve 6, nozzles 3.2 and 3.3 control solenoid valve 7 and nozzles 3.4 and 3.5 control solenoid valve 8, and if a specific valve is energized when the effective nozzle is positioned over a slotted section or it is not energized when the effective nozzle is positioned over an unslotted section, then in position V there is obtained the position-combination for solenoid valves 6, 7, and 8 in the given sequence L, O, L, wherein "O" indicates the non-energized state in this connection and "L" indicates the energized state.

If nozzle 3.1 is situated in the area of position III, the resulting position combination for solenoid valves 6, 7, and 8 is L, L, O. During the pivoting of lever 1 from position zero into position VII, the solenoid valves thus assume consecutively the combinations of positions characterized by Table 2, assuming that solenoid valves A, B and C are replaced by solenoid valves 6, 7, and 8.

If nozzle 3.1 is situated at the boundary or separation between positions II and III, the section of the position-combination of the solenoid valves either in accordance with position II (O, L, O) or in accordance with next position III (L, L, O) is taken care of through the special reciprocal arrangement of the slots of the separate stages.

On the other hand, if it was contemplated that three tracks 11, 12 and 13 would be sensed only with a single nozzle for each track and the nozzles would be arranged radially in relation to each other, and should the nozzles become positioned on the line of separation between position III and position IV, any of the eight possible position-combinations of Table 2 can be triggered in connection with certain inaccuracies in the shape of the slots, their reciprocal arrangement and the alignment of the nozzles toward one another. Accordingly, numerous false signals may be released during a slow switching from position III to position IV or in the case where the nozzles stop at the line of separation between positions III and IV.

On the other hand, if the tracks are sensed according to the invention with 5 nozzles in the special reciprocal arrangement, only the position-combination of the solenoid valves for position III can be read or only that for position IV, if nozzle 3.1 is situated on the line of separation between such positions, as can be readily checked by means of Table 2.

Figure 3:
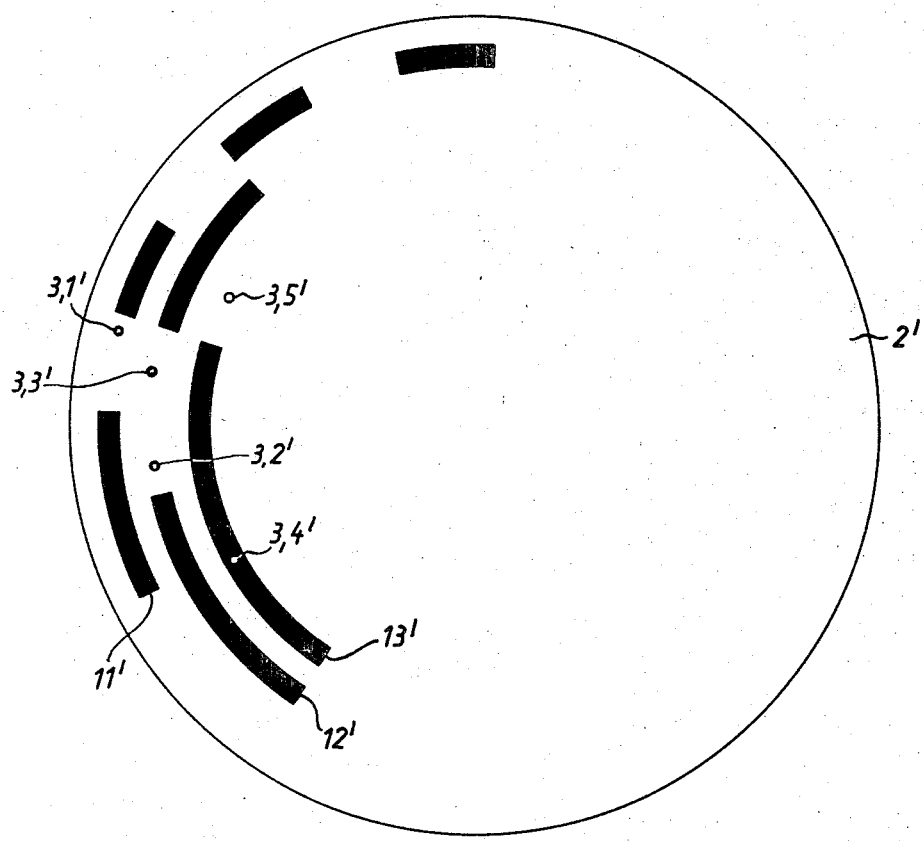
FIGS. 3–6 show modifications of parts corresponding to that of FIG. 2.

FIG. 3 shows a disk 2' corresponding to disk 2. In comparison with FIG. 2, the slotted sections are replaced by unslotted sections. In addition, the slots of tracks 11', 12' and 13' are so arranged in relation to each other that the nozzles can be arranged spatially particularly advantageously for a certain case. It thus becomes clear that the position of the slotted and unslotted sections from track to track need not be fixed in any particular manner, provided that the nozzles are arranged over the tracks in such a reciprocal arrangement that during the pivoting of lever 1 of FIG. 1 they assume substantially the same relative positions in regard to the slotted and unslotted sections of the tracks as the nozzles in regard to the slotted and unslotted sections in FIG. 2.

Figure 4:
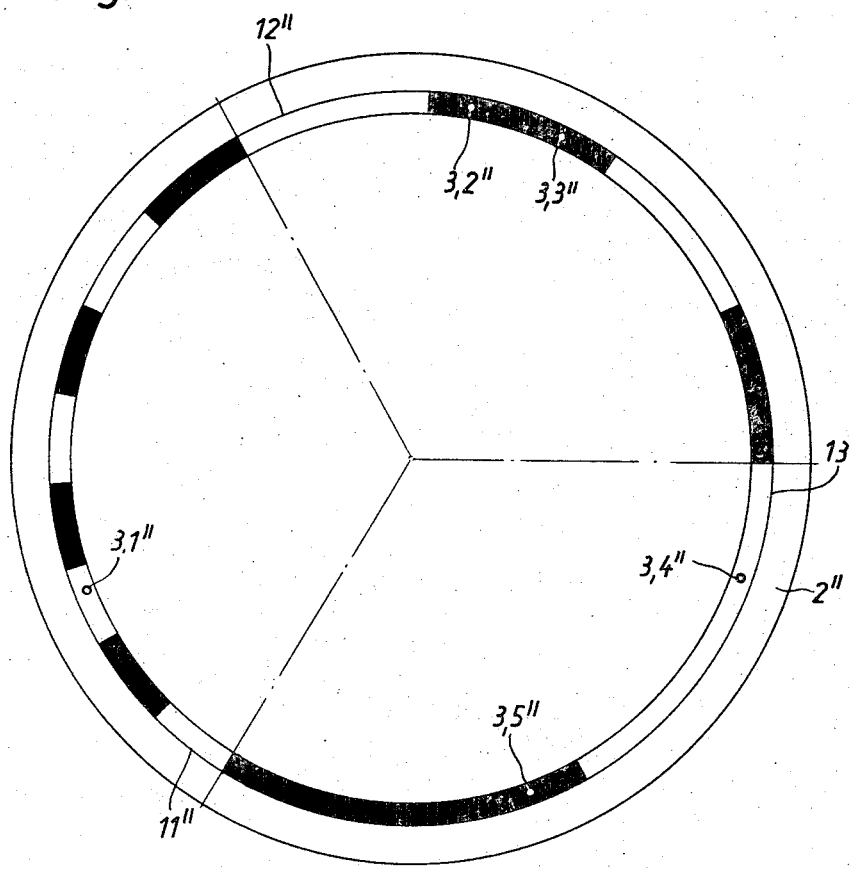

FIG. 4 shows a further disk 2'' corresponding to disks 2 and 2'. Here the tracks do not extend along concentric circular sections but form a single closed circular path which is divided into three equal circular sections of equal diameter. The first circular ring section is associated with track 11'', the second circular ring section is associated with a track 12'' and the third ring section is associated with a track 13''. Tracks 11'', 12'' and 13'' correspond to tracks 11, 12, and 13 of FIG. 2. Nozzles 3.1'' to 3.5'' situated on a common circle are associated with tracks 11'', 12'' and 13''. When disk 2'' is turned by 120°, nozzles 3.1'' to 3.5'' will release in accordance with Table 2 the same sequences of signals to solenoid valves 6, 7, and 8 as with the disk 2 of FIG. 2.

It is to be understood that the tracks need not be arranged on a single disk. It is also possible to provide a separate disk for each track and to arrange the disks firmly one after another on a common shaft. The tracks may be situated in this connection on arcs of a circle having identical or different radii.

Instead of being arranged on a disk along arcs of circle, the slots may also be situated on the peripheral surfaces of drums. Finally, the slots need not necessarily be arranged on structures that are symmetrical in rotation, but may extend also along a strip or a plurality of strips, that are held displaceable in suitable manner in relation to the nozzles.

Figure 5:
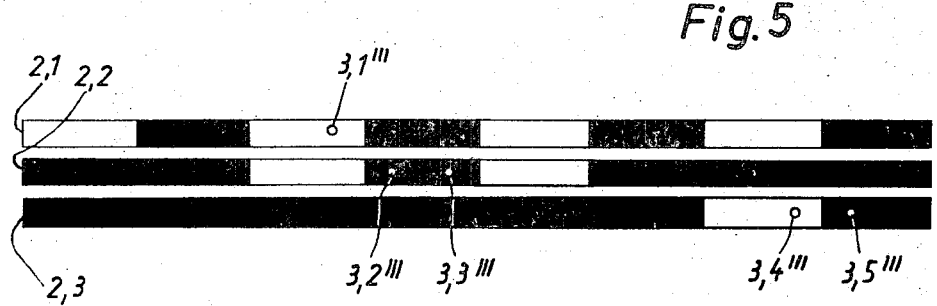

In FIG. 5, there are three disks 2.1, 2.2 and 2.3. Each disk carries a track which is rolled out in a plane for the purposes of clarity and facilitating comprehension. As seen clearly in the drawings, the three tracks are all formed of the same size. In accordance with the preceding embodiments, one track is faced by a single sensing element 3.1'''', while two sensing elements 3.2''', 3.3''' and 3.4'''', 3.5'''', respectively, are arranged opposite to the two other tracks. Known gear arrangements, that are not shown but known in the art disposed between the three coaxial disks 2.1, 2.2, 2.3, as a result of which the disks rotate in the ratio 4:2:1. This means that disk 2.1 rotates twice as fast as disk 2.2 and four times as fast as disk 2.3. Sensing elements 3.2''' and 3.3''', as well as sensing elements 3.4''' and 3.5''' are situated in each case at the same distance from each other.

The track of disk 2.1 has four slotted and four unslotted sections, that alternatingly follow one another. The track of disk 2.2 has two slotted sections that are separated by an unslotted section and the track of disk 2.3 possesses only a single slotted section. Every slotted and unslotted section of the three tracks is made of the same size. During a relative movement of disks 2.1, 2.2, and 2.3 in relation to one another at the given ratio of 4:2:1, sensing elements 3.2''' and 3.3''' face an unslotted or slotted section twice as long as sensing element 3.1 and sensing elements 3.4''' and 3.5''', for their part, face a slotted or unslotted section twice as long as sensing elements 3.2''' and 3.3''' or they face a slotted or unslotted section four times as long as sensing element 3.1'''. Accordingly, it is apparent that the sensing elements can be arranged in such a manner in relation to each other that during a movement of the disks as described above one obtains the sensing relationships corresponding, for example, to those of the device of FIG. 2. Further, it is apparent that in the case of disk 2.2 only one half of the sensing range of disk 2.1 is required and in the case of disk 2.3 only one forth of the sensing range of disk 2.1 is required. As explained more in detail in the following exemplified embodiment, under special conditions it may be of advantage to arrange two sensing elements also in front of the specially shaped tracks of disk 2.1. The sensing elements of a track possess in such a case advantageously the same distance in relation to one another, so that they can be interchanged as sensing units.

The arrangement can also be constructed by employing three disks of identical shape. In such a case, each can be half-slotted and half-unslotted. The gearing provided between the disks must be such that during a turning of the control lever for traversing every stage, the inner disk turns exactly one full turn, while the central disk turns twice and the outer disk turns four times.

Figure 6:
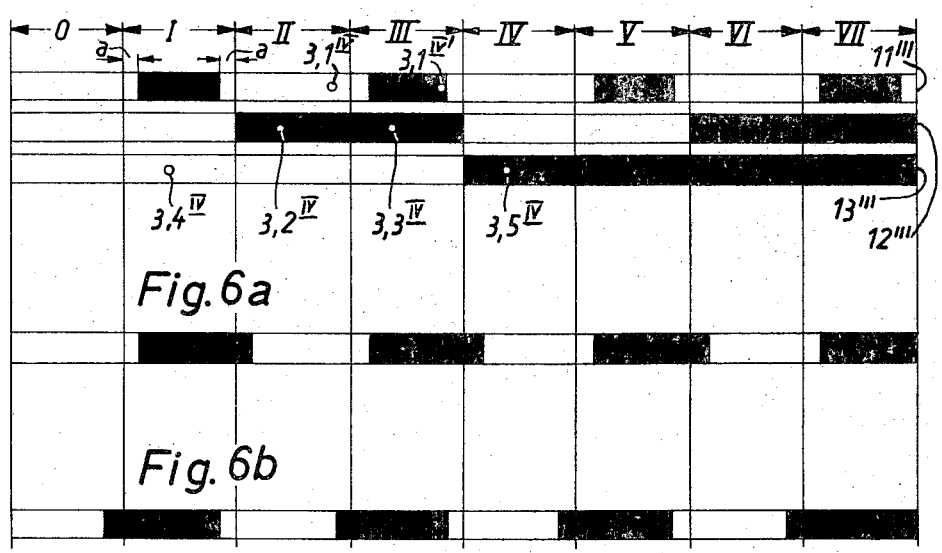

FIG. 6 shows three concentric sensing paths, in accordance with FIG. 2, which paths are rolled into a plane for purposes of clarity. Sensing path $11'''$ comprising four slotted and unslotted sections corresponds to sensing path 11 of FIG. 2. Sensing paths $12'''$ and $13'''$ comprising two slotted sections and one slotted section, respectively, correspond to sensing paths 12 and 13 of FIG. 2. In accordance with FIG. 2, sensing paths $12'''$ and $13'''$ are faced by two sensing elements $3.2^{IV}$ and $3.3^{IV}$ and $3.4^{IV}$ and $3.5^{IV}$, respectively. In the arrangement of the sensing elements in FIG. 6, however, in contrast with the embodiment of FIG. 2, sensing path $11'''$ is faced by two sensing elements $3.1^{IV}$ and $3.1^{IV'}$. As a further difference in relation to FIG. 2, the unslotted sections are lengthened. In particular, the slotted sections are shortened on either side of their central line by an amount "$a$". The distance between sensing elements $3.1^{IV}$ and $3.1^{IV'}$ equals the distance between sensing elements $3.2^{IV}$ and $3.3^{IV}$. The arrangement of sensing element $3.1^{IV}$ corresponds here to the arrangement of single sensing element 3.1 in FIG. 2.

Accordingly, while tracks $12'''$ and $13'''$ and sensing elements $3.4^{IV}$, $3.5^{IV}$ and 3.4, and 3.5 correspond exactly, the following possibility is provided through the particular shape of track $11'''$ in connection with sensing elements $3.1^{IV}$ and $3.1^{IV'}$ associated therewith: if sensing elements $3.1^{IV}$ and $3.1^{IV'}$ are each connected to a control input of a flip-flop, the latter can cooperate with a circuit in such a manner that in each case the circuit receives only the signal of the sensing element which is situated over a slotted (black) section. If sensing element $3.1^{IV}$ is situated over a slotted section, only the sensing element $3.2^{IV}$ is read in the next track, for example in accordance with the procedure of the device of FIG. 2. On the other hand, if sensing element $3.1^{IV'}$ is situated over a slotted section, only sensing element $3.3^{IV}$ is read in the next track. The two sensing elements over track $11'''$ are spaced at such a distance from each other and the slotted sections of the tracks are so shortened in each case on either side of their central lines that two sensing elements $3.1^{IV}$ and $3.1^{IV'}$ cannot be positioned simultaneously over a slotted section.

If one of two sensing elements $3.2^{IV}$ or $3.3^{IV}$ of track $12'''$ is selected, right sensing element $3.5^{IV}$ is selected in accordance with the procedure of the device of FIG. 2, if the selected sensing element of track $12'''$ is situated over an unslotted section. On the other hand, if the selected sensing element of track $12'''$ is situated over a slotted section, left sensing element $3.4^{IV}$ is selected.

The device of the FIG. 6 differs in relation to the device of FIG. 2 in that the lever for turning the disk which comprises tracks $11'''$, $12'''$ and $13'''$ can remain stopped in the area of the positions "O" to VII intermediate between two stages and, within a path of about $2a$, it can even be subjected to oscillations therein, without thus causing an oscillation of the signals between two adjacent stages.

If the sensing head comprising sensing elements of tracks $11'''$, $12'''$ and $13'''$ is moved from left to right according to the drawings, sensing element $3.1^{IV'}$ arrives first over a slotted field, in order to switch the connected flip-flop in a corresponding manner. The flip-flop remains in its switching position, until other sensing head $3.1^{IV}$ arrives over the slotted field and reverses the flip-flop. If sensing head $3.1^{IV}$ is situated on the left edge of the slotted section, as illustrated in FIG. 6, sensing head $3.1^{IV}$ is still spaced by the distance of about $2a$ from the left sensing head. It is therefore apparent that during a movement of the sensing head from left to right the slotted sections always appear widened at the right end by about $a$ beyond the line of separation between two stages, as illustrated schematically in FIG. 6a. Similarly, on the other side of the slots appear always widened at their left ends by about $a$ beyond the lines of separation between two stages, if the sensing head runs over the tracks from right to left, as indicated schematically in FIG. 6b.

It is thus clear that in the area of the separation lines between two stages, no switching from one stage to another one occurs through a distance of about $2a$. Consequently, an oscillation between the stages is also not possible. Therefore, the device of the invention can be compared to a pivotable lever that engages a fork pivotable with the lever, the fork possessing a width of about $2a$, and the lever can be reciprocated within the fork, without releasing a signal. Accordingly, in contrast with the device of FIG. 2, the device possesses a certain hysteresis between the separate stages, which is determined by the distance $2a$.

Figure 7:
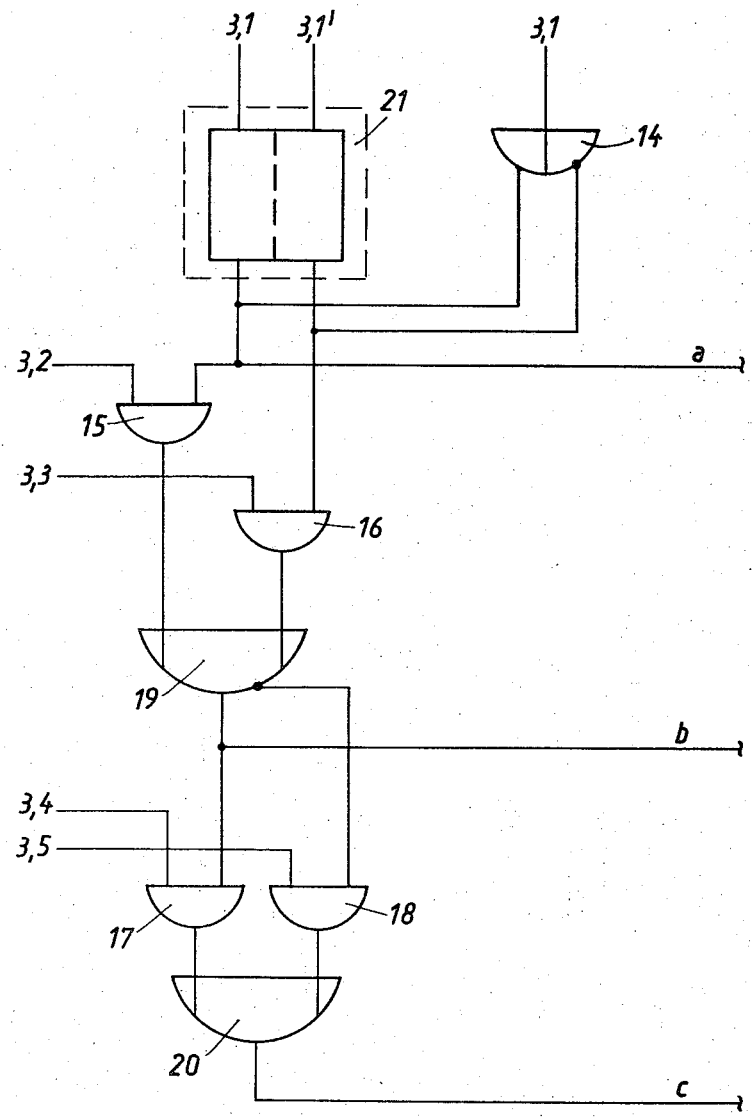
FIG. 7 shows schematically the monitor circuit associated with the brake control device of FIG. 1.

FIG. 7 shows a fluid circuit designated at 5 in FIG. 1. Depending on the position of the brake control lever, three solenoid valves are energized in a particular switching combination through the circuit.

With reference to a device corresponding to the embodiments of FIGS. 2-5, sensing element 3.1 of the outer track is connected to an OR/NOR element 14, while sensing elements 3.2 and 3.3 as well as sensing elements 3.4 and 3.5 are connected in each case to a first input of AND elements 15, 16, 17 and 18. An output of the OR/NOR 14 element is connected in each case to another input of AND elements 15, and 16. The outputs of AND elements 15 and 16 are connected to the inputs of an OR/NOR element 19. The two outputs of OR/NOR element 19 are led respectively to other inputs of AND elements 17 and 18. From an input of AND element 15, an output $a$ branches off. From an output of OR/NOR element 19, an output $b$ branches off and the outputs of AND elements 17 and 18 are led to the inputs of an OR element 20, that is connected to an output $c$.

If there is no input signal to OR/NOR element 14, i.e., sensing element 3.1 is situated over a blocking or non-sensing position, an output appears on AND element 16, if a signal is released by sensing element 3.3. If there is an input to OR/NOR element 14, an output appears on AND element 15, if a signal is released by sensing element 3.2. If no outputs are present on AND elements 15 and 16, and output exists on AND element 18, if a signal is released by sensing element 3.5. If an output is present on AND element 15 and/or AND element 16, an output is present also on AND element 17, if a signal is released by sensing element 3.4. If an output is present on AND element 17 and/or AND element 18, an output is present on OR element 20.

With reference to a device corresponding to the embodiment of FIG. 6, two nozzles 3.1 and 3.1' over outer track 11''' are connected to the opposite control inputs of a flip-flop 21, that is illustrated by dash lines in FIG. 7. A first output of the flip-flop 21 is connected to a second input of AND element 15 and the other output of the flip-flop is connected to AND element 16. In contrast with an OR/NOR element, a flip-flop remains in its switching state because of an input signal through its first control input until it is switched into its other switching state through an input signal at the other control input, as in well known.

In the drawings showing the described embodiments the left nozzles of the central track are always designed by 3.2 and the right nozzles of this track are designated by 3.3. Consequently, only the signal of right nozzle 3.3 is transmitted to OR/NOR element 19 through the circuit for the embodiment with and without a hysteresis over AND element 16, if nozzle 3.1 is situated over an unslotted zone. If nozzle 3.1 is positioned over a slot or nozzle 3.1' is situated over an unslotted zone, only the signal on the left nozzle 3.2 is always transmitted to OR/NOR element 19 through AND element 15. In a corresponding manner, only one of two nozzles 3.4 and 3.5 of the inner track is selected, the selection depending on the position of the selected nozzle 3.2 or 3.3 over a slotted or over a non-sensing zone.

In the circuit comprising flip-flop 21, the signal of the first nozzle of track 11''' of FIG. 6 remains stored until it is erased by a signal of the other nozzle. Because of the lengthening of the non-sensing sections of track 11''', as compared with the corresponding non-sensing sections of the embodiments of FIGS. 1-5, the flip-flop remains in a particular switching state approximately through a distance $a$ on either side of the line of separation between two stages, until it is reversed by a subsequent signal.

In other words, it is made certain that the signal of the nozzle of the outer track remains stored approximately by the distance $a$ on either side of a line of separation between two stages, before the signal is erased by a subsequent signal of the other nozzle. It is clear that with a relative shifting of the nozzles along the tracks, from left to right according to the drawings, through every one of the eight positions, from O to VII, the signal combination given above in Table 1 is obtained at the outputs $a$, $b$ and $c$ of the circuits in FIG. 7 without and with a hysteresis, "O" indicating absence of signal and "L" indicating presence of signal.

The present invention and particularly the embodiment of FIG. 6 is not restricted to brake control devices for vehicles, in particular railroad vehicles. One skilled in the art has available a large number of remote-control devices for stepwise displacement of an output part, for which the embodiment of FIG. 6 offers considerable advantages, as shown above, because of the fact that it can be made certain in a particularly simple manner that false signals can no longer be released in the immediate area of lines of separation between two stages, which is of particular importance for fluid sensing devices.

It will be understood that this invention is susceptible to modification in order to adapt it to different usages and conditions, and accordingly, it is desired to comprehend such modifications within this invention as may fall within the scope of the appended claims.

What is claimed is:

1. In a brake control device for railway vehicles and the like having a remote indicator for the state of connection of a plurality of control lines for controlling a plurality of valves connected to a source of control energy to introduce a predetermined level of brake pressure into a brake cylinder in response to particular connections of the control lines, the combination of means for defining a plurality of control paths corresponding to the plurality of control lines, said paths being equal in length or subtending equal angles and the sequence of said paths being designated by position $m$ beginning at 0, 1, 2 . . . , each path comprising an alternating series of $2^m$ sensing and non-sensing zones, means comprising a plurality of sensing elements for sensing the sensing and non-sensing zones of said paths, one of said sensing elements being located opposite the path of the highest position and a pair of sensing elements located opposite each of any further paths and spaced longitudinally thereon, one of said pair of sensing elements being positioned before and the other after the sensing elements of the highest position path or of the corresponding elements of the next highest position path, and monitor means connected to said sensing elements for selecting in each state of connection of the control lines only one of the two sensing elements of the second higher position path with respect to the position of the location of the sensing element of the highest position path over a sensing or non-sensing zone and for selecting one of two sensing elements of the next lower position path by a selected sensing element of a path with respect to the sensing element of the highest position path.

2. In a brake control device as claimed in claim 1 and an auxiliary sensing element opposite said highest position path, said auxiliary sensing element being disposed at such a distance from said one sensing element and the sensing zone of said path being so shortened that only one of said auxiliary and said one sensing elements can be located at any one time over a sensing zone, said monitor means comprising signals storage means for storing a signal from one of said auxiliary and one sensing elements until it is erased through the signal of the other sensing element.

3. In a brake control device as claimed in claim 2 wherein the distance between said auxiliary and said one sensing elements is greater than the length of a sensing zone and less than the length of a non-sensing zone of said highest position path.

4. In a brake control device as claimed in claim 1 wherein a sensing element comprises a first nozzle for releasing a jet of fluid and a second nozzle opposite said first nozzle upon which said jet impinges, said second nozzle being connected to said monitor means, said first and second nozzles being on opposite sides of a sensing path, said sensing zone comprising a slot through which said jet can pass and said non-sensing zone comprising a solid portion to block said jet from impinging on said second nozzle.

5. In a brake control device as claimed in claim 4 and an auxiliary sensing element opposite said highest position path, said auxiliary sensing element being disposed at such a distance from said one sensing element and the sensing zone of said path being so shortened that only one of said auxiliary and said one sensing elements can be located at any one time over a sensing zone, said monitor means comprising signal storage means for storing a signal from one of said auxiliary and one sensing elements until it is erased through the signal of the other sensing element, said signal storage means comprising a bistable fluidic amplifier having control inputs connected to the second nozzles of said auxiliary and one sensing elements.

6. In a brake control device as claimed in claim 1 wherein said sensing paths are disposed one after the other along a straight line.

7. In a brake control device as claimed in claim 1 wherein said sensing paths are disposed along parallel straight lines.

8. In a brake control device as claimed in claim 1 wherein said sensing paths are disposed on annular sectors.

9. In a brake control device as claimed in claim 8 wherein said annular sectors define one of a ring or a partial ring.

10. In a brake control device as claimed in claim 8 wherein said annular sectors are concentric and subtend the same angle.

11. In a brake control device as claimed in claim 1 and a plurality of separate members and a sensing path on each of said members.

12. In a brake control device as claimed in claim 11 wherein said members comprise a plurality of rotatable coaxial disks and each sensing path comprises an annular sector.

13. In a brake control device as claimed in claim 12 wherein each of said sensing paths is equally divided into sensing and non-sensing zones, gear means for drivingly coupling said disks to each other, said gear means being such to rotate the disks of the m position at a speed of $2^m/2$ with respect to the remaining disks.

14. In a brake control device as claimed in claim 13 wherein the sensing element opposite a single sensing path comprises a unit, said units being identical.

* * * * *